M. GORRITZEN.
ELECTRIC HEATING PLATE.
APPLICATION FILED NOV. 10, 1920.
1,384,660.
Patented July 12, 1921.
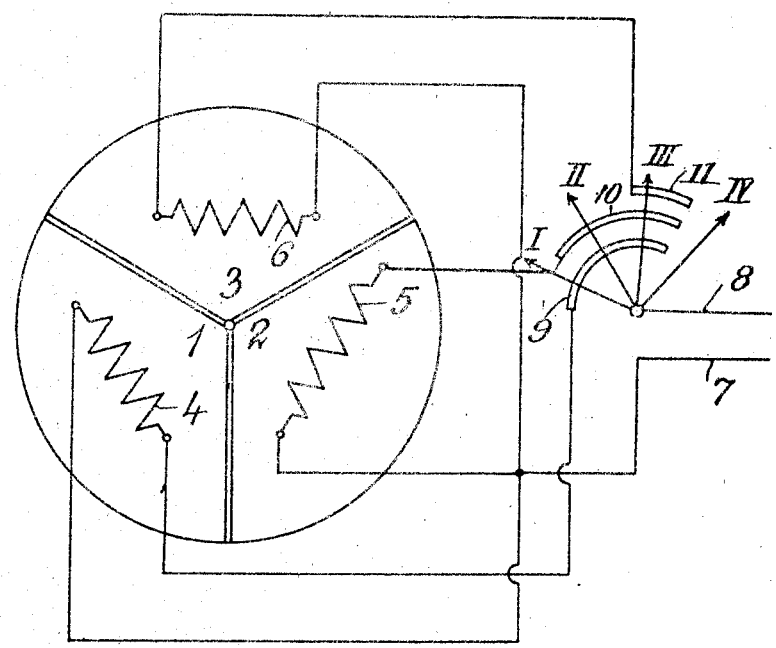
Inventor
Michael Gorritzen
By [signature] Atty.

UNITED STATES PATENT OFFICE.

MICHAEL GORRITZEN, OF STAVANGER, NORWAY.

ELECTRIC HEATING-PLATE.

1,384,660.  Specification of Letters Patent.  Patented July 12, 1921.

Application filed November 10, 1920. Serial No. 423,067.

*To all whom it may concern:*

Be it known that I, MICHAEL GORRITZEN, a subject of the King of Norway, residing at Stavanger, Norway, have invented certain new and useful Improvements in Electric Heating-Plates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object an electric heating plate comprising a plurality of separate plates, which may be heated independently of each other and which are controlled from a common switch.

The object of the invention is to provide a heating plate the supply of heat to which may be easily regulated when used with cooking vessels covering the whole plate, and which may at the same time be heated only partially in case it is used for a smaller cooking vessel.

A form of the invention is illustrated on the drawing.

The cooking plate is formed by a circular plate comprising three sectors 1, 2, 3, each of which is provided with heating elements 4, 5, 6 supplied with current from conducting wires 7, 8 through a switch board, which is indicated diagrammatically on the drawing, where the four positions of the switch arm is indicated with numerals I, II, III, IV.

One end of the heating elements 4, 5, 6 is connected with conducting wire 7, while the other ends are connected respectively with conducting segments 9, 10, 11.

As it will be easily seen the element 4 only will be heated when the switch is in position I. In position II elements 4, 5 will be heated and in position III all the elements will be heated. In position IV the current is completely cut off.

It is obvious that the number of sections of the heating plate may be varied.

Claims:

1. An electric heating plate comprising a plurality of sector shaped sections, an independent heating element in each section, and a switch for connecting one or more of said heating elements with a supply current.

2. An electric heating device, comprising a circular plate consisting of a plurality of independent sector-shaped sections, a separate heating element in each section, a conducting wire connected with one end of each heating element, conducting segments connected with the other ends of said heating elements, and a switch connected with the conducting wire for connecting a second conducting wire with one or more of the conducting segments.

In testimony that I claim the foregoing as my invention, I have signed my name in presence of two subscribing witnesses.

MICHAEL GORRITZEN.

Witnesses:
MAGDA HOËSATH,
A. OLSEN HANGEN.